United States Patent [19]
Wisniewski

[11] Patent Number: 4,835,403
[45] Date of Patent: May 30, 1989

[54] CLOCKED OPTICAL SENSING APPARATUS

[75] Inventor: Michael A. Wisniewski, Bolingbrook, Ill.

[73] Assignee: Bell & Howell Company, Chicago, Ill.

[21] Appl. No.: 947,826

[22] Filed: Dec. 30, 1986

[51] Int. Cl.⁴ .............................................. G01N 21/86
[52] U.S. Cl. ................................ 250/561; 250/223 R; 377/53
[58] Field of Search ................... 250/223 R, 221, 559, 250/560, 561; 356/373, 447; 377/53

[56] References Cited

U.S. PATENT DOCUMENTS

| | | | |
|---|---|---|---|
| 4,068,222 | 1/1978 | Treviranus | 250/221 |
| 4,458,146 | 7/1984 | Reiner et al. | 250/221 |
| 4,591,708 | 5/1986 | Shu | 250/221 |
| 4,636,633 | 6/1987 | Roger et al. | 250/223 R |
| 4,652,742 | 3/1987 | Wauer et al. | 250/223 R |

Primary Examiner—David C. Nelms
Assistant Examiner—Stephone B. Allen
Attorney, Agent, or Firm—Laff, Whitesel, Conte & Saret

[57] ABSTRACT

A document sensor comprises a source of infrared light directed toward a document and a photocell for reacting to the light as it is reflected from the document. A clock drives the light source to send cyclically recurring light pulses toward the document. The clock source also enables a detector each time that the document light source is switched on. After a predetermined number of successive reflected light pulses have been picked up, a document present signal is given.

13 Claims, 2 Drawing Sheets

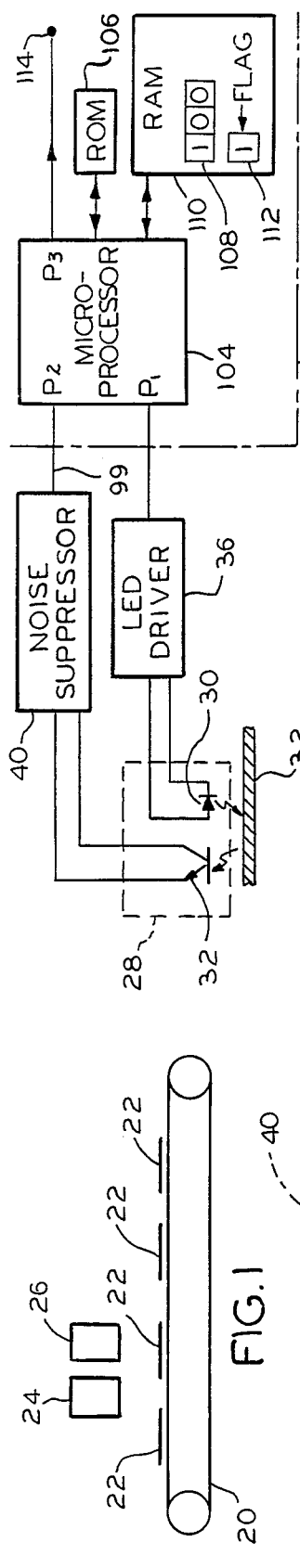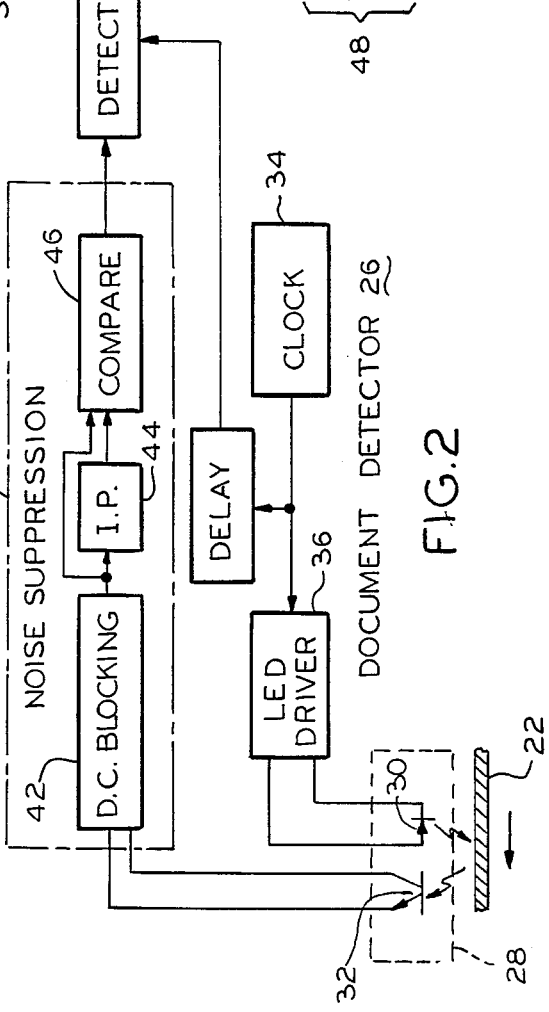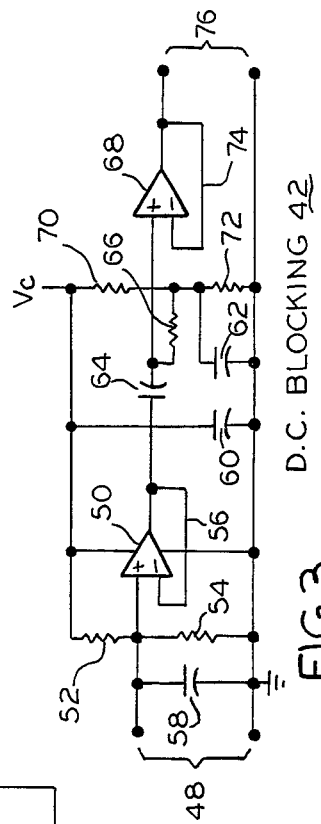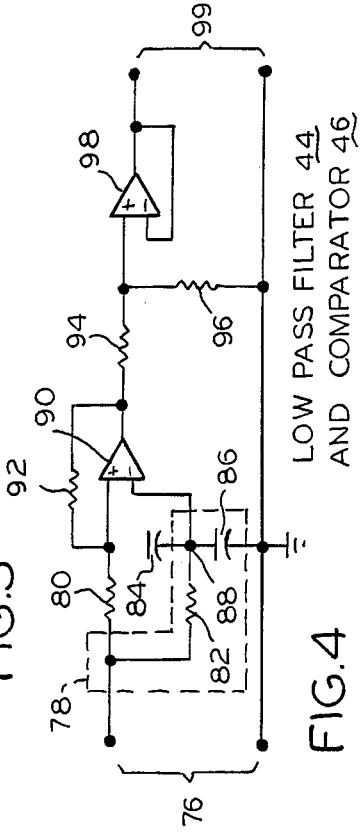

CLOCKED OPTICAL SENSING APPARATUS

This invention relates to document sensors and more particularly to sensors for detecting items such as bills, invoices, letters, postcards, and the like.

It will be convenient to refer herein to a detection or sensing of "documents"; however, the claims should be construed broadly enough to cover a detector for all suitable items.

Heretofore, it has been a common practice to use an optical sensor to detect documents as they travel over a path or are otherwise presented at a particular location. Very often, the optical sensor comprised a light directed toward a photocell. The document passed between the source of the light and the photocell, thereby shielding the light from the photocell, which gives a document present signal.

A difficulty with such a sensor is that, sometimes, there may be dirt conditions either in the air or on the photocell, misalignment between the light source and photocell, or the like, which give a marginal detection condition. Sometimes, there may be sources of ambient light which are directed toward the photocell. Other times, there may be transient conditions which give electrical signals simulating the presence of a document. Many of these and similar problems may appear simultaneously.

As a result, there is a need for some means for logically analyzing the sensor output in order to verify the document presence and to reject false signals simulating such presence.

Accordingly, an object of the invention is to provide new and improved means for and methods of sensing the presence of documents. In this connection, an object is to provide sensors which give signals that may be logically interpreted to verify the results. Here, an object is to provide a general purpose optical sensor having greater reliability than has been available heretofore.

Another object of the invention is to provide new and improved mail handling systems. Here, an object is to detect the presence of a document or similar item in a transport path.

Still another object of the invention is to prevent false signals which incorrectly indicate the presence of a document or similar item. In this connection, an object is to accomplish these ends while using readily available, low cost commercial optical sensors.

In keeping with an aspect of the invention, these and other objects are accomplished by providing a clock driven, infrared light source which flashes at a cyclically recurring rate. A photocell detects each light flash as it is reflected from a document, thereby generating a train of document present pulses which may be analyzed by logic circuits, which are also driven by the same clock. Thus, if the document present pulses are properly sychronized with the light flashes, there is a valid document detection. If they are not so synchronized, the indication is that the document present signal is a false one.

A preferred embodiment of a document detection system incorporating the invention is shown in the attached drawings, in which:

FIG. 1 is a stylized showing of a document delivery system with a document detector;

FIG. 2 is a block diagram of the inventive document detector;

FIG. 3 is a schematic circuit diagram which shows a D.C. blocking circuit used in the noise suppressor;

FIG. 4 is a schematic circuit diagram which shows a low pass filter and a comparator used in the noise suppressor;

FIG. 5 is a block diagram which shows how the output of the document detector may be logically analyzed by a microprocessor;

Figure 7:
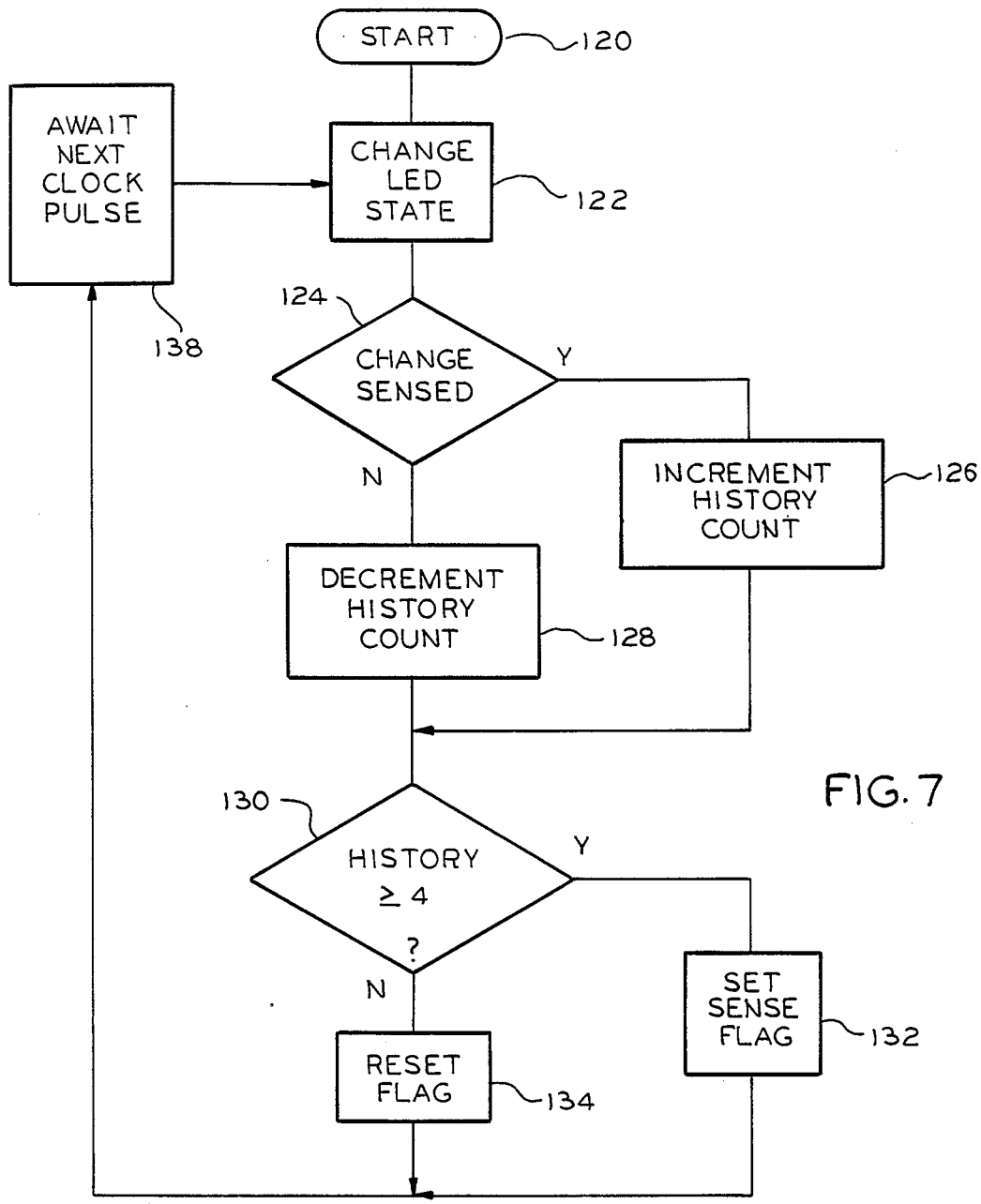
FIG. 7 illustrates the operation of the document detection circuit by means of a flow chart.

FIG. 1. represents any suitable document delivery system by a conveyor belt 20, which conveys documents 22 past any suitable work station 24. The inventive sensor 26 is located in a position which determines that a document is in fact present and being presented to the work station 24. The particular nature of the conveyor 20, documents 22, and work station 24 is irrelevant. However, for description purposes, it might be assumed that work station 24 is a device which detects stamps on envelopes to be sure that postage has been paid. Detector 26 detects the presence of an envelope. Therefore, if detector 26 indicates that a document 22 is present and if work station 24 fails to detect a stamp, the document may be diverted, for example.

Document detector 26 (FIG. 2) includes a commercially available sensor 28 which combines an infrared LED (light emitting diode) 30 and a photocell 32 that responds to infrared light. One commercial sensor which may be used is designated "S11101" by its manufacturer Skan-A-Matic Corp. of Elbridge, N.Y. 13060. This sensor is able to detect documents traveling at a speed of 40 inches/second. The manufacturer states that the smallest detectable object is 0.06-inches and that the sensor is not responsive to visible ambient light.

The relative positions of the LED diode 30 and photocell 32 are unimportant as long as the light is reflected into the photocell. Thus, either may be upstream or downstream, above or below the other. The noise sources in the photocell output may result from such things as printing on the envelope, ambient infrared light, envelope transparency (light passing from the back, through and to the photo cell in front of the envelope), reflectivity of the document surface, and the like. Usually, dust or similar substances can intefere with a sensor's performance, but the infrared beam of sensor 28 has the advantage that it easily penetrates such obstructions.

The LED 30 shines an infrared light beam upon the document 22 which reflects it into the photocell 32 that is adjacent the LED. The LED 30 is driven by a clock 34 and driver circuit 36, which switch the diode on and off at a rate of 1000 Hz, for example. Therefore, the sensor 28 output, from the photocell 32, is a 1000 Hz square wave pulse train.

Figure 6:
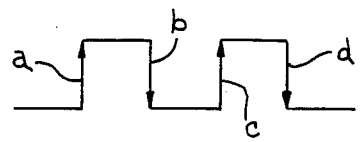
FIG. 6 illustrates the output of the photocell forming part of the document detector.

FIG. 6 illustrates the output of sensor 32. When the document 22 reflects light from diode 30 into photocell 32, there is an upgoing transition a in the photocell output. When the diode 30 switches off, there is an oppositely going transition b. When the diode next switches on, there is a third and upgoing transition c. When the diode next switches off, there is a fourth and opposite going transition d. Thus, by twice switching on the diode 30, four transitional states are generated in the output of the photocell.

The sensor 28 output is fed into a noise suppression circuit 40 which includes a D.C. blocking circuit 42, a low pass filter 44, and a compare circuit 46. The D.C. blocking circuit 42 provides D.C. isolation. The low pass filter 44 passes any low frequency output (such as low frequency hum) of the sensor 28 to a negative input of the compare circuit 46, while suppressing the 1000 Hz square wave. The positive input of the compare circuit 46 receives the output of the sensor 28 directly from D.C. blocking circuit 42.

The details of the D.C. blocking circuit are given in FIG. 3. The 1000 Hz square wave output of the sensor 28 is applied through input terminals 48 to a buffer amplifier. A voltage divider 52, 54 sets the input bias for the amplifier. Negative feedback is provided at 56. Capacitors 58, 60, 62 provide a noise bypass to ground.

Differentiator 64, 66 provides an AC coupling to amplifier 68, which acts as an output gate. The voltage divider 70, 72 sets the input bias for amplifier 68. Negative feedback is provided at 74. The net effect of the D.C. blocking circuit 42 is an isolation from sensor 28, an elimination of noise, and a reshaping of the pulse train.

FIG. 4 shows the details of the low pass filter 44 and comparator 46. The input terminals 76 of FIG. 4 are connected to the output terminals 76 of FIG. 3. The circuit 78 is a low pass filter circuit which comprises resistor 82 and capacitor 86, which together form an RC network having an RC time constant of about 2.2ms that provides a low pass reference voltage at the potential point 88. The reference potential results from a voltage which is held on capacitor 86.

The incoming signals, which appear at terminals 76, are applied via input resistor 80 to the positive (+) terminal of a comparator in the form of a differential amplifier 90 while the low frequency reference potential appearing at potential point 88 is applied to the negative (−) terminal of amplifier 90. A small capacitor 84 is provided between the (+) and (−) terminals as a high frequency noise suppresser. Resistor 92 provides a positive feedback to the (+) terminal. Thus, compare circuit 46 subtracts out any low frequency noise component from the output of sensor 28. The high gain provided by feedback resistor 92 allows circuit 46 to act as a digital wave shaper. Resistor 94 provides for output coupling and current limiting. Resistor 96 provides bias for a unity gain amplifier 98, which gives a shaped pulse, square wave output. Thus, the output 99 of the comparator is a voltage limited, square wave which can be fed directly into a microprocessor.

FIG. 5 is a block diagram which shows a circuit for utilizing the invention. In greater detail, the square wave output 99 of the comparator circuit 46 is fed directly to a detector 100 (FIGS. 2 and 5), which is operated at the same clock rate (clock 34) that is used to drive the sensor 28. A delay circuit 102 provides a delay corresponding to the inherent circuit delays that occur in the noise suppressor 40. Therefore, the detector 100 is fully synchronized with the sensor.

The detector 100 includes a microprocessor 104 which operates in response to a program stored in a read only memory 106. The microprocessor monitors the sensor 28 output signals at the system clock rate (e.g. 1000 times/second). For example, the detection signal may be "0" while the LED 30 is lit and document 22 is present and may be "1" when the LED 30 is not lit or a document is not present.

Each time that a detection signal appears (i.e. the LED 30 is on, the document 22 is present, and photocell 32 gives an output), the microprocessor stores a memory of the photocell output at a "history" location 108 in a random access memory 110.

The invention is designed to respond to four changes of state or transitions in the output of the sensor 28; however, it should be understood that another system could respond to one polarity of these transitional signals. Moreover, the system could be designed to respond to any suitable number of such signals. Therefore, the reference to four signals is not to be construed as necessarily limiting the invention thereto.

If four document caused detection signals (i.e. output pulses of sensor 28) to appear at the system clock rate, each of the first three signals is stored at history location 108. The fourth signal appears at 112 as a flag signifying that a document has in fact been detected. Responsive to the flag, a document present output signal is given at 114.

The number of attempts required prior to the issuance of a flag signal may be changed to suit the system needs. In one exemplary system, the history location 108 is a counter that is not allowed to go above "7" or below "0". A match between a lit LED 30 and a photocell 32 output pulse increases by "1" the count stored at counter 108 and a mismatch reduces that stored count by "1". If no document is present, the reducing count stored at 108 soon reaches zero, even if a false signal has been received. If a document 22 is present, the increasing count stored at 108 soon reaches "7". After any net succession of four successful counts, the flag 112 is given. After a document has passed the sensor 28, or if the document is otherwise "removed", the count stored at 108 reaches zero and the flag 112 is removed, if it has appeared.

FIG. 7 explains the operation of the system by means of a flow chart. Responsive to a clock pulse, at the start 120 of a program, there is a change 122 in the state of the LED 30 (i.e. the diode either lights or goes out to give one of the transitions a-d (FIG. 6)). If, after a suitable delay, the change in the state of the LED 30 is sensed 124, a count of one transition 126 is added by incrementing the counter 108 (FIG. 5). If the change in the state of the LED 30 is not detected, one missed transition is subtracted 128 by decrementing counter 108. As previously mentioned, counter 108 is arranged not to increment beyond 7 or decrement below 0.

Next, a comparison is made 130 to determine whether the history count stored at 108 is equal to or greater than four. If it is equal to or greater than four 132, the flag 112 (FIG. 5) is set. If the history count stored at 108 is less than four, the comparison at 130 leads to a reset 134 of the flag. The state of flag 112 is the detector output. A SET condition (Logical 1) indicates that a document is detected; a RESET condition (Logical 0) indicates that a document is not detected.

After each setting or resetting of the flag, there is a wait 138 for the next clock pulse, after which the LED state is changed again 122 for the next iteration of the program.

Those who are skilled in the art will readily perceive how to modify the invention. Therefore, the appended claims are to be construed to cover all equivalent structures which fall within the true scope and spirit of the invention.

I claim:

1. A document sensor comprising sensor means for directing light toward, and receiving said light reflected from a document, means for generating light-caused electrical signals responsive to said light reflected when documents are present, detector means responsive to said electrical signals, clock means for cyclically switching said light on and off and for enabling said detector means during intervals while said detector may respond to said electrical signals generated by said sensor means as it receives said reflected light, and output means reponsive to said detector means for recording the number of said on and off light cycles, regardless of the amplitude of said cycles above a detectable amplitude, and successively responding to a predetermined number of said on and off light cycles of any detectable amplitude for signaling the presence of a document.

2. The document sensor of claim 1 wherein said sensor means comprises an infrared light source for directing said light on to said document.

3. The document sensor of claim 2 further comprising noise suppressor means coupled between said sensor means and said detector means.

4. The document sensor of claim 3 wherein said noise suppressor comprises filter means and comparator means for passing said electrical signals generated by said sensor means responsive to the receipt of said reflected light, said comparator means comparing said electrical signals generated by said sensor means with a low frequency component of said electrical signals.

5. The document sensor of claim 4 wherein said output means comprises counter means, means responsive to each enabling of said detector means for incrementing said counter means to count up if one of said electrical signals is received or to count down if one of said electrical signals is not received, and means responsive to said counter reaching a predetermined count for giving said document present signal.

6. A method of detecting documents comprising the steps of:
(a) periodically changing the state of an infrared light source;
(b) periodically enabling a sensing of said change of state of said light source contingent upon presence or absence of a document;
(c) recording a history of the presence or absence of said sensed changes at each of said periodic enablings regardless of the amplitude of said changes of state above a detectable level; and
(d) giving a document-present signal when the recorded history indicates that said document has been present at each of a predetermined number of successive enablings regardless of the amplitude of said changes of state above a detectable level.

7. The method of claim 6 further comprising means responsive to said document present signal for reseting said recorded history to await the next document detection.

8. The method of claim 7 comprising the further steps of using a common clock means for periodically changing said state in step (a) and enabling said sensing in step (b).

9. The method of claim 8 comprising the added steps of delaying an output of said common clock means for a period equal to circuit response times in said sensing step, and applying said delayed signal to enable said sensing in step (b) of claim 6.

10. A system for detecting documents comprising clock means for generating a train of clock pulses, means for periodically changing the state of an infrared light source responsive to said clock pulses, means responsive to said clock pulses for periodically enabling a sensing of said change of state of said light source contingent upon presence or absence of a document regardless of the amplitude of said changes of state above a detectable level, means for recording a history of the presence or absence of said sensed changes at each of said periodic enablings of said sensing means, and means for giving a document-present signal repsonsive to the recorded history indicating that said document has been present at each of a predetermined number of successive enablings regardless of the amplitude of said changes of state above a detectable level.

11. The system of claim 10 further comprising means responsive to said document present signal for reseting said recorded history to await the next document detection.

12. The system of claim 11 further comprising means for delaying said train of clock pulses for a period equal to circuit response times in said sensing step, and means for applying said clock pulse train to said means for periodically changing the state of said light source and for applying said delayed train of clock pulses to said means for recording said history.

13. The system of claim 12 wherein said history recording means comprises counter means, means responsive to each enabling of said sensing means for incrementing said counter means to count up if one of said change of state is indicated or to count down if one of said change of state is not indicated, and means responsive to said counter reaching a predetermined count for giving said document present signal.

* * * * *